Sept. 3, 1968    R. M. RINDER    3,399,474
DIGITAL DISPLAY DEVICE USING REFLECTED LIGHT
Filed Jan. 18, 1968

INVENTOR:
ROBERT M. RINDER
BY Peter L. Tailer
ATTORNEY

United States Patent Office 3,399,474
Patented Sept. 3, 1968

3,399,474
DIGITAL DISPLAY DEVICE USING REFLECTED LIGHT
Robert M. Rinder, 425 E. 12th St., New York, N.Y. 10009
Continuation-in-part of application Ser. No. 589,413, Oct. 25, 1966. This application Jan. 18, 1968, Ser. No. 703,216
9 Claims. (Cl. 40—28)

ABSTRACT OF THE DISCLOSURE

Four slides containing apertures and having light reflecting areas thereon are mounted on a base having light reflecting areas thereon so that a small movement of one or more of the slides will align apertures and light reflecting areas to indicate digits from 0 to 9. The digits are indicated in a conventional manner in seven windows which, in this invention, are formed in a cover. The light reflecting areas appearing in a window to indicate a portion of a digit are at least one third the width of the window.

Cross-reference to related application

This application is a continuation-in-part of my presently pending patent application, Ser. No. 589,413, filed on Oct. 25, 1966, now abandoned and entitled, Digital Indicator.

Background of the invention (field of the invention)

This invention relates in general to devices which display a given digit in response to an input; and, more particularly, to a digital indicator which decodes standard inputs to display a given digit.

Digital indicators conventionally display digits from 0 to 9 in response to electrical or other signals in the following manner. When no signals are applied to an indicator station, it would display a 0. An input signal applied to each of four inputs of a digital indicator station would cause it to display, respectively, the digits 1, 2, 4 and 8. Signals applied to inputs one and two of a digital display station would cause it to indicate the digit 3, to inputs two and four the digit 6, to inputs one and four the digit 5, to inputs one, two, and four, the digit 7, and to inputs one and eight the digit 9. Thus, signals applied to any one of or combinations of inputs of a digital display station may cause it to indicate digits from 0–9 in response thereto.

Description of the prior art

Some digital display devices have a plurality of light sources at each display station so that the light sources may be selectively activated to illuminate elongated windows to form a recognizable digit. Such display devices require decoding circuits to have signals from the conventional four inputs light suitable light sources at each display station. Other digital display devices use neon lights formed to represent digits or they use lights having filaments formed to represent digits. These require high voltages, are expensive, and have other disadvantages.

U.S. Patent No. 3,054,203 discloses a device which may be used for digital display, the device having four moving slides as does that of this invention. However, each window which indicates a portion of a digit as disclosed in this patent is divided into at least sixteen aperture locations which must be disposed in a matrix of four possible aperture locations disposed in four rows. Thus, each portion of a digit indicated in the window according to this patent can, at most, occupy one sixteenth the area of the window. The instant invention allows the portion of a digit indicated in a window to occupy at least one third of the area of a window and extend completely along the entire length of a window. The large area used in the instant invention to indicate a portion of a digit in a window allows this invention to be effective using reflected light.

Summary of the invention

Four slides are disposed over a base and under a cover, the cover containing seven windows within which portions of digits from 0 to 9 are indicated. The slides contain apertures and the base and the slides have light reflecting areas thereon. The slides are movable from a first to a second position to align light reflecting areas behind apertures and at least some of said windows to indicate digits as said slides are left in a first position, moved singly to a second position, or moved in combinations to a second position. The light reflecting areas indicating portions of a digit in a window are at least one third the width of the window and extend completely across a window to clearly indicate a portion of a digit therein.

Thus, the main object of this invention is to provide a less expensive and more reliable digital indicator.

Another object of this invention is to provide a more simple and efficient digital indicating device which indicates digits from 0 to 9 directly in response to signals from four input sources.

A further object of this invention is to provide a digital indicator which will function using only reflected light.

An additional object of this invention is to provide a digital indicator which is compatible with existing systems.

Description of the preferred embodiment

Figure 1:
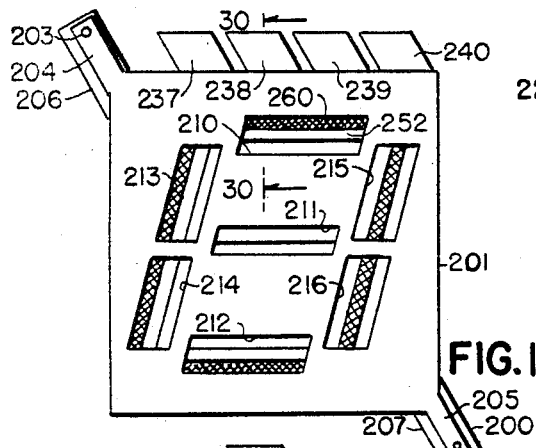
FIGURE 1 is a front view of a digital indicating station which is manually operated and which illustrates a simple example of the device of this invention.
Figure 2:
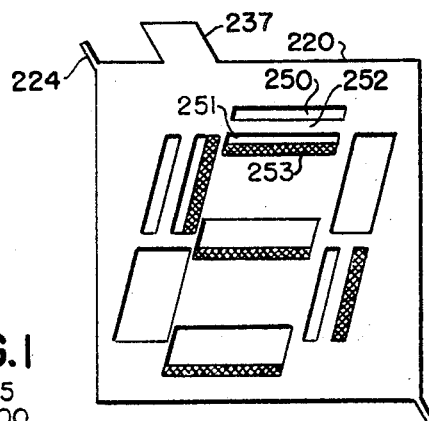
FIGURES 2, 3 4, and 5 are front views of first, second, third, and fourth movable slides of this invention.
Figure 3:
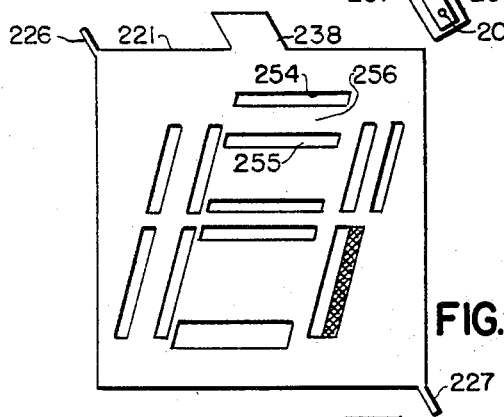
Figure 4:
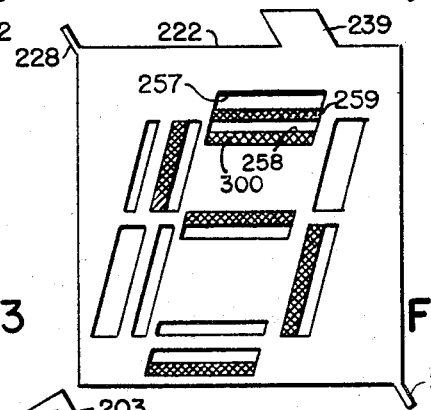
Figure 5:
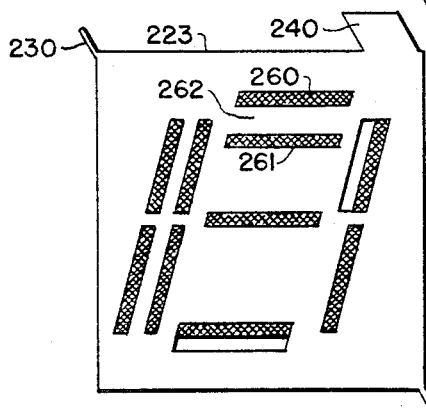
Figure 6:
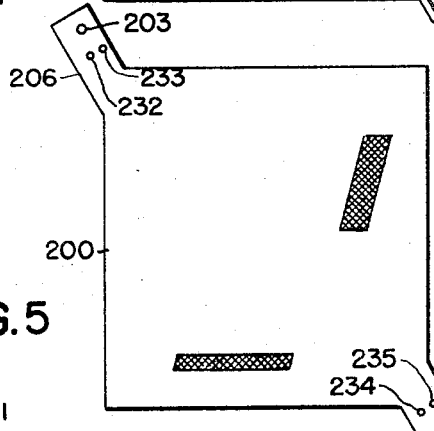
FIGURE 6 is a front view of the base of the indicator shown in FIGURE 1.

FIGURES 1–7 show an embodiment of my invention which is only intended to use reflected light. FIGURE 1 is a top view of a manually operated model of a single digital indicating station. A base or back board 200 has a window cover 201 fixed a spaced distance in front of it by means of the two screw 202 and 203 which extend between corner extensions 204 and 205 of plate 201 to corner extensions 206 and 207 of base 200. Plate 201 contains the three horizontal windows 210, 211, and 212 and the four substantially vertical windows 213, 214, 215, and 216.

Slides 220, 221, 222, and 223 have corner guide projections 224, 225, 226, 227, 228, 229, 230, and 231 formed integrally with them. The guide projections 224, 226, 228, and 230 extend between the pair of guide pins 232 and 233 projecting upward from corner extension 206 of base 200. The guide projections 225, 227, 229, and 231 extend between the pair of guide pins 234 and 235 which extend upward from corner extension 207 of base 200.

Upper tabs 237, 238, 239, and 240 are formed integrally with the slides 220, 221, 222, and 223 and are pulled manually upward to cause this illustrative embodiment of my invention to indicate a digit. The pulling upward of a tab 237, 238, 239, or 240 corresponds to an input signal. Thus the pulling upward of a tab 237, 238, 239, or 240 moves a slide 220, 221, 222, or 223 obliquely upward and to the left as shown. Pulling tab 237 causes the indicating station to indicate the digit 1, the tab 238 the digit 2, tabs 237 and 238 the digit 3, tab 239 the digit 4, tabs 237 and 239 the digit 5, tabs 238 and 239 the digit 6, tabs 237, 238 and 239 the digit 7, tab 240 the digit 8, and tabs 237 and 240 the digit 9. As shown in FIGURE 1 with none of the tabs pulled upwards, the indicating station is indicating the digit 0.

Thus it may be seen that this embodiment of my invention indicates the digits from 0 to 9 by a color, black as shown, which is printed or otherwise formed in blocks on the slides 220, 221, 222, and 223 and on the base 200. The color could also be a reflecting surface formed on a darker base and slides. As shown in FIGURE 1, the digit 0 is indicated by showing color for one third of the width of the windows 210, 212, 213, 214, 215, and 216.

Figure 7:
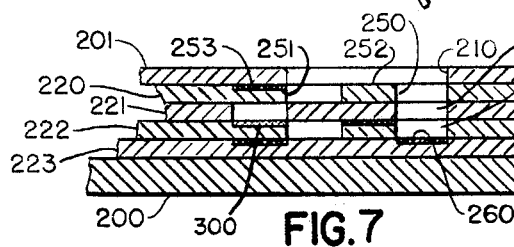
FIGURE 7 is a section taken on line 30—30 of FIGURE 1.

As may be seen in FIGURES 2–7, slide 220 behind window 210 has the slits or openings 250 and 251 formed in it and separated by a space 252. A colored block or light reflecting area 253 is printed below slit 251. Slide 221 behind window 210 contains the slits 254 and 255 separated by the double width space 256. In the same relative location behind window 210 slide 222 contains the slits 257 and 258 separated by the single width color printed space 259 and having a second single width color printed space therebelow. Behind window 210 slide 223 has printed on it the two colored blocks 260 and 261 which are separated by a double unprinted space 262. Thus, as shown in FIGURE 7, a viewer sees the colored block 260 through the slits 250, 254, and 257 and the window 210 when the indicating station is indicating the digit 0. In this same manner, using the patterns shown, digits from 0 to 9 are displayed through the seven windows 210–216.

The digit 1 is indicated in windows 213 and 214; the digit 2 in windows 210, 215, 211, 214, 212; the digit 3 in windows 210, 215, 211, 216, and 212; the digit 4 in windows 213, 211, 215, and 216; the digit 5 in windows 210, 213, 211, 216, and 212; the digit 6 in windows 210, 213, 214, 211, 216, and 212; the digit 7 in windows 210, 215, and 216; the digit 8 in all windows; and the digit 9 in windows 213, 210, 215, 211, 216 and 212.

This embodiment of my invention could have its slides moved by electromagnets, hydraulic devices, or the like to display a row of digits with a number of indicating stations. While one particular and working geometry of slits, spaces, and colored blocks are shown for this invention, it is not limited to this particular geometry. It is also to be noted that this embodiment of my invention requires only four input signals to indicate all digits from 0 to 9 and that no decoding circuits are required. While slits or openings have been set forth as being formed in the slides 220, 221, 222, and 223, it is to be understood that these may also be any transparent or light passing areas.

While I have disclosed my invention in the best form known to me, this is purely exemplary and modifications may be made without departing from the spirit and scope of the invention except as it may be more limited in the appended claims.

What is claimed is:

1. A digital indicator comprising, in combination, at least one indicating station indicating digts from 0 to 9 in response to four input signals and combinaitons thereof, said at least one indicating station having a base, four slides each movable from a first to a second position and disposed one behind the other on said base, means moving one of said slides from the first to the second position in response to each input signal, and a cover disposed over said slides, said cover containing windows within which portions of digits are indicated, said slides containing openings and said slides and said base having light reflecting areas formed thereon, movement of said slides aligning openings over light reflecting areas behind said windows indicating portions of digits in said windows.

2. The combination accordng to claim 1 wherein said openings in said slides and said light reflecting areas indicating a portion of a digit therethrough in said windows extending substantially across one dimension of said windows.

3. The combination according to claim 2 wherein said openings and said light reflecting areas are at least one third the width of said windows.

4. The combination according to claim 3 wherein said cover contains upper, central, and lower elongated horizontal windows, right and left upper elongated substantially vertical windows, and right and left lower elongated substantially vertical windows; said slides move obliquely between the angles of said horizontal and vertical windows; said openings in said slides are slits; and said light reflecting areas are elongated blocks, said slits and blocks disposed behind said horizontal windows being horizontal and said slits and blocks disposed behind said substantially vertical windows being substantially vertical.

5. The combination according to claim 4 wherein behind said upper horizontal window of said cover said uppermost slide has an upper slit, a space, a lower slit, and a colored block; said second slide has an upper slit, a double width space, and a lower slit; said third slide has an upper slit, an upper colored block, a lower slit, and a lower colored block; and said fourth slide has an upper colored block, a double width space, and a lower colored block.

6. The combination according to claim 4 wherein behind said central horizontal window of said cover said uppermost slide has a double width slit and a colored block therebelow; said second slide has an upper slit, a space, and a lower slit; said third slide has a colored block and a slit therebelow; and said fourth slide has a single colored block.

7. The combination according to claim 4 wherein behind said lower horizontal window of said cover said uppermost slide has a triple width slit and a colored block therebelow; said second slide has a double width slit; said third slide has an upper slit, a space, a lower slit, and a colored block therebelow; said fourth slide has a colored block and a slit therebelow; and said base has a single colored block.

8. The combination according to claim 4 wherein behind said upper right substantially vertical window disposed from left to right said uppermost slide has a triple width slit; said second slide has a first slit, a space, and a second slit; said third slide has a double width slit; said fourth slide has a slit and a colored block; and said base has a double width colored block; and wherein behind said upper left substantially vertical window disposed from left to right said uppermost slide has a first slit, a space, a second slit, and a colored block; said second slide has a first slit, a double space, and a second slit; said third slide has a first slit, a space, a colored block, and a second slit; and said fourth slide has a first colored block, a space, and a second colored block.

9. The combination according to claim 4 wherein behind said lower right substantially vertical window disposed from left to right said uppermost slide has a slit, a space, and a colored block; said second slide has a slit and a colored block; said third slide has a colored block and a slit; and said fourth slide has a colored block; and wherein behind said lower left substantially vertical window disposed from left to right said uppermost slide has a quadruple width slit; said second slide has a first slit, a double width space, and a second slit; said third slide has a double width slit, a space, and a slit; and said fourth slide has a first colored block, a space and a second colored block.

References Cited

UNITED STATES PATENTS

| | | |
|---|---|---|
| 3,054,203 | 9/1962 | French. |
| 3,110,893 | 11/1963 | Peacock _____ 340—324 |

FOREIGN PATENTS

| | | |
|---|---|---|
| 370,728 | 4/1932 | Great Britain. |
| 414,407 | 5/1966 | Germany. |

JOHN W. CALDWELL, *Primary Examiner.*

A. J. KASPER, *Assistant Examiner.*